Aug. 25, 1970  R. G. BROWNSTEIN  3,525,273
DIFFERENTIAL DRIVE MECHANISM
Filed Jan. 23, 1968  4 Sheets-Sheet 1
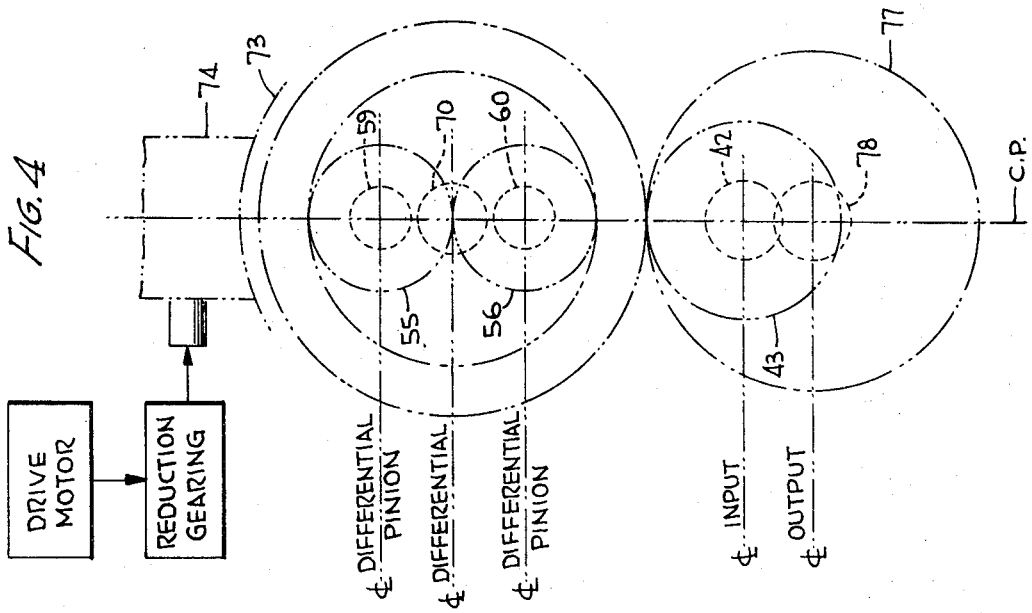
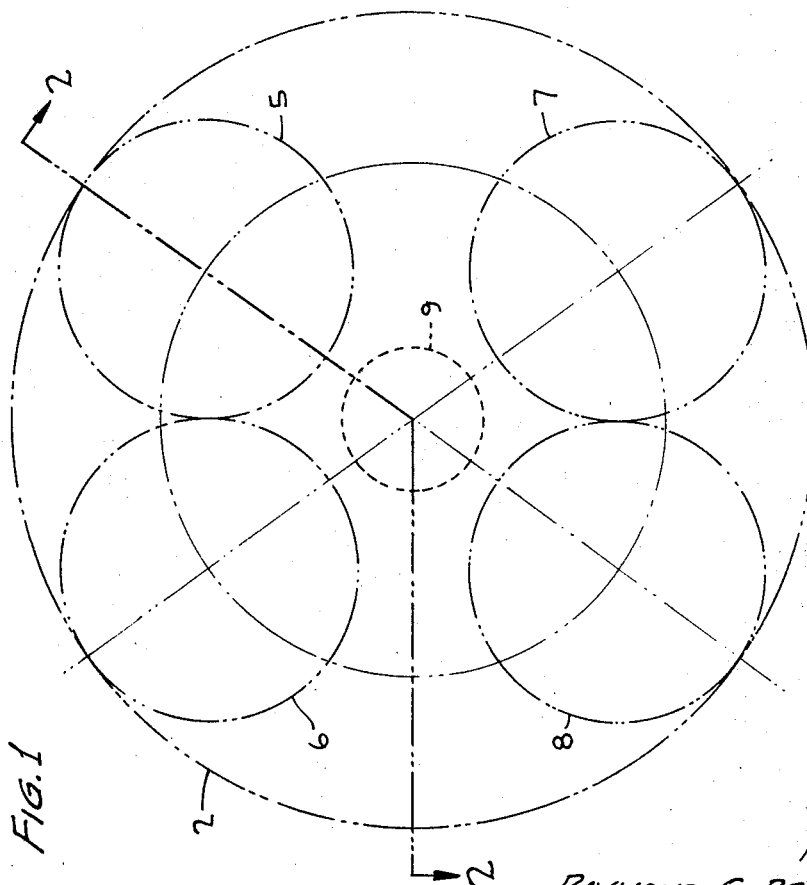
INVENTOR,
RAYMOND G. BROWNSTEIN
BY Jocelyn E. Davidson
ATTORNEYS

INVENTOR,
RAYMOND G. BROWNSTEIN

BY Jacobi & Davidson
ATTORNEYS

Aug. 25, 1970 R. G. BROWNSTEIN 3,525,273
DIFFERENTIAL DRIVE MECHANISM
Filed Jan. 23, 1968 4 Sheets-Sheet 3

INVENTOR,
RAYMOND G. BROWNSTEIN
BY Jacobi & Davidson
ATTORNEYS

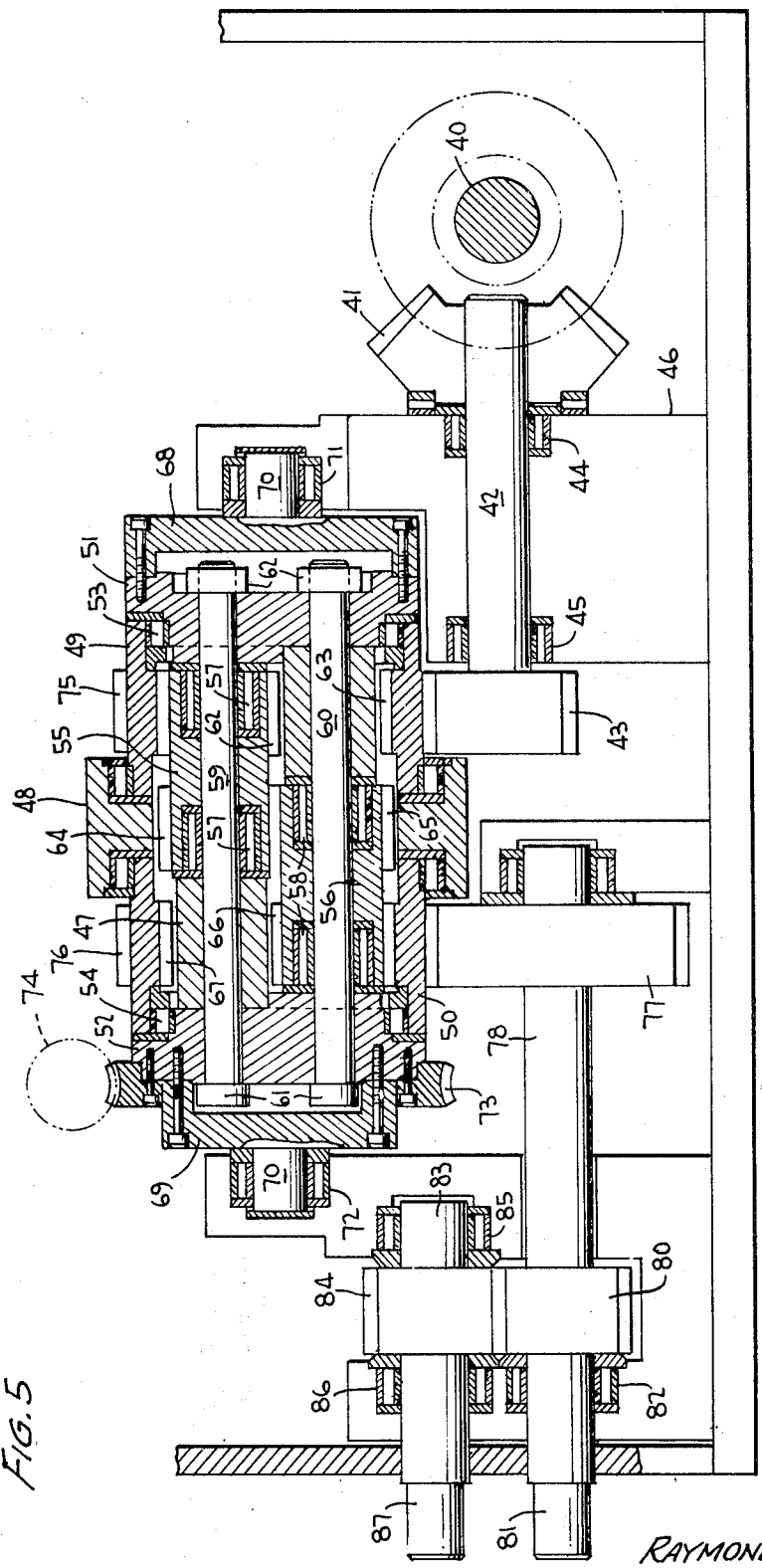

United States Patent Office 3,525,273
Patented Aug. 25, 1970

---

3,525,273
DIFFERENTIAL DRIVE MECHANISM
Raymond G. Brownstein, Ellwood City, Pa., assignor to Thomas Machine, Inc., Pittsburgh, Pa., a corporation of Pennsylvania
Filed Jan. 23, 1968, Ser. No. 699,894
Int. Cl. F16h *37/08, 1/42*
U.S. Cl. 74—675
9 Claims

ABSTRACT OF THE DISCLOSURE

A differential drive mechanism of compact structure utilizing spaced internally and externally toothed ring gear means, carrier suported intermeshing internal differential pinion means in mesh with the internal teeth of the ring gear means, direct external input and take-off gear means meshing with the external teeth of the ring gear means and means to rotate the carrier to provide a differential drive relationship.

---

Figure 2:
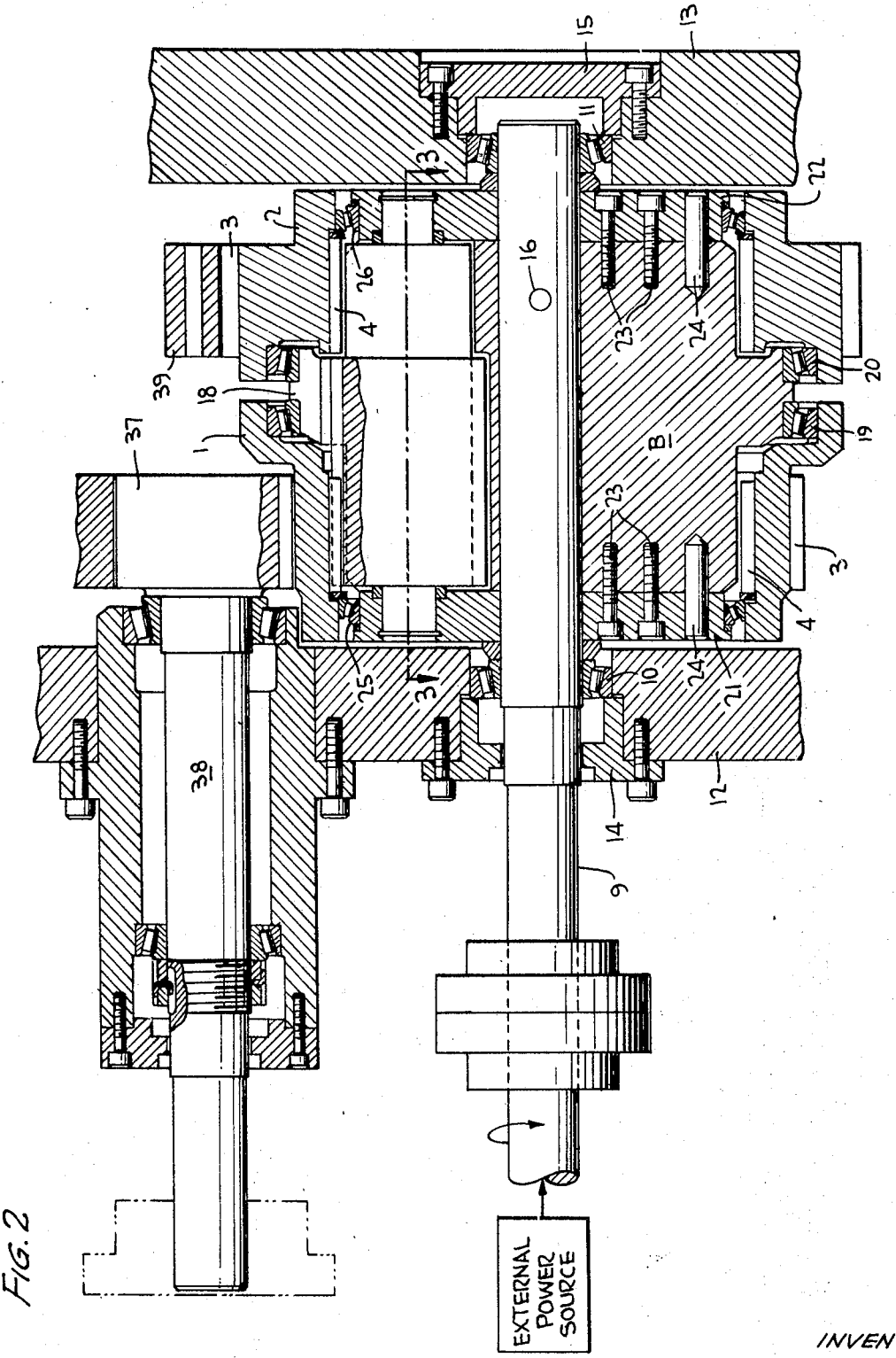

The present invention relates broadly to the art of mechanical movements and more particularly to differential drive mechanism.

Still more particularly this invention relates to a differential drive mechanism of the type in which the speed of an output member can be varied at will.

The known or existing types of differential drive mechanisms of this general character utilize either a bevel gear arrangement which does not have enough capacity or a planetary type in which a sun gear is disposed internally of two sets of differential pinions. This latter arrangement is not completely satisfactory primarily because the size of the sun gear, its mounting shaft and bearings necessarily dictate a greater radical spacing of the pinions. Furthermore, use of the sun gear as a driving gear requires additional input and output gears.

Accordingly this invention has for an object to provide a differential drive mechanism utilizing only ring and pinion gears so as to be more compact, and thus provide a greater capacity in relation to the space occupied.

Another object of this invention is to provide such a differential mechanism in which all the torque is transmitted through gear teeth and gear bodies thus eliminating any torque transmitting keying arrangements.

It is a particular object of the invention to provide a differential drive mechanism including axially spaced ring gears having internal and external teeth, one being an input ring gear and the other an output ring gear, a gear carrier means, at least one pair of parallel pinion means carried by such carrier means, intermeshing with one another over a portion of their lengths, with one portion of one pinion means meshing with the internal teeth of one ring gear and the opposite portion of the other pinion means meshing with the internal teeth of the other ring gear to transmit drive between input and output, and means for rotating the carrier means and thus translating or orbiting the pinion means relative to the ring gears to vary the output speed.

It is a more particular object to provide such a differential drive mechanism in which the ring gears are rotatably supported by the carrier means.

It is a still more specific object to provide a differential drive mechanism as just set forth in which a central shaft carries the gear carrier means, two pairs of pinion means are mounted therein, and such shaft is driven to orbit the pinion means and vary the output speed.

It is a further object to provide a more simplified differential drive mechanism including a rotatably supported cage or carrier means, axially spaced, internally and externally toothed driving and driven ring gears rotatably supported by such cage or carrier means, laterally spaced, parallel shafts within such cage or carrier means, a double-pinion structure on each shaft with one portion of each pinion structure meshing with the internal teeth of the ring gears and the other portions of the respective double-pinion structures intermeshing and an external gear on the cage or carrier means adapted to be driven to orbit the double pinion structures to vary the speed relation.

Consistent with the immediately aforegoing objects it is a more particular object of this invention to improve the alignment capability of the mechanism by mounting all rotary elements in heavy-duty anti-friction bearings.

As a more specific object such immediately aforementioned bearings are straight roller bearings which facilitate assembly of all components.

Figure 3:
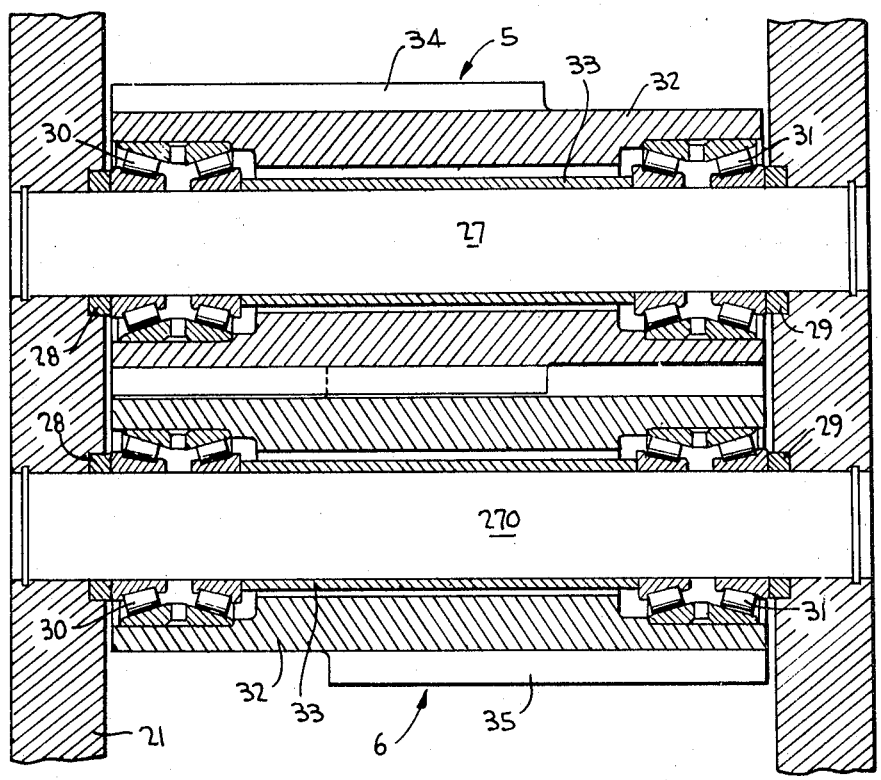

Further and more specific objects of this invention will be apparent from the following description taken in connection with the accompanying drawings in which:

FIG. 1 is a diagrammatic end view illustrating the pitch line arrangement of the differential pinions of one form of a differential drive mechanism according to the invention, FIG. 2 is a fragmentary cross sectional view of a differential drive mechanism utilizing the pinion arrangement of FIG. 1 and related to section line 2—2 of FIG. 1, FIG. 3 is a fragmentary sectional view taken along line 3—3 of FIG. 2 and illustrating one pair of intermeshing differential pinions, FIG. 4 is a view similar to FIG. 1 but illustrating the differential pinion pitch line relation and the pitch line relation of the input and output gears, of another form of the invention, FIG. 5 is a view partly in elevation and partly in vertical section through a constructional embodiment of the invention conforming to the pitch line relationships shown in FIG. 4.

Basically the development of this invention embodies a cooperative gearing arrangement of compact structure that reduces the number of gears and shafts to a minimum consistent with torque transferring capability and which is thus more compact, easier to assemble in unit relationship and consequently more economical both from initial costs and from maintenance considerations.

Thus the invention as illustrated includes a unit assembly incorporating input and output, aligned internally and externally toothed ring gear means, at least two differential pinion means within the pitch circle of said ring gear means, a carrier means for such differential pinion means, an intermeshing relationship to establish a gear train between the input ring gear means to a portion of said differential pinion means, thence through an intermeshing further portion of said respective differential pinion means, and through another portion of said differential pinion means to the output ring gear means with a drive gear means being associated in mesh with the input ring gear and a take-off gear means in mesh with said output ring gear means and independent means to rotate said carrier means to vary the speed relationship between said drive gear means and said take-off gear means.

With reference to the drawings the form of invention illustrated in FIGS. 1 to 3 includes axially spaced ring gears 1 and 2 each having external teeth 3 and internal teeth 4. Within the pitch circle of these gears are carried two pairs of differential pinions, constituting upper pinion means 5 and 6 and lower pinion means 7 and 8. These pinions are mounted in a carrier means that includes a main body B having recesses therethrough to accommodate the toothed gear bodies of pinions 5, 6, 7 and 8. The carrier or cage means is secured to a central shaft 9 that is journalled in anti-friction thrust bearing means 10 and 11 mounted at opposite end walls 12 and 13 of a main housing structure H, only a portion of which is shown in FIG. 2. Suitable thrust absorbing members, 14 and 15 are secured to the housing walls 12 and 13 to set and secure the central shaft 9 and bearing means 10 and 11 in a properly supported relation.

The shaft 9 via pin connection means as at 16 is secured to the body member B that is bored to accommodate the gears 5, 6, 7, 8. Further this body member B is provided with an external peripheral flange 18 shaped to accommodate the inner races of axially spaced, tapered anti-friction bearing means 19 and 20 which journal the adjacent inner ends of the input ring gear 1 and output ring gear 2. These latter two gears are shaped so as to include projecting annular flanges or extensions that provide seatings for the outer races of such tapered bearing means 19 and 20. The opposite ends of said body member B are closed by end plates 21 and 22 that are bored to accommodate shaft 9 and also have bores therein to receive the opinion supporting shafts for gear means 5, 6, 7 and 8. These end plates are secured to the body member B by bolt and pin connections such as shown at 23 and 24 in FIG. 2.

The periphery of the end plates 21 and 22 are shaped to accommodate the inner races of anti-friction tapered bearing means 25 and 26, the outer races of which are supported at the inner periphery at projecting annular flanges or extensions at the other ends of the respective ring gears 1 and 2.

With this aforedescribed relationship of components, the central shaft is journalled in a main housing, the carrier body and end plates are fast with the central shaft and the axially spaced ring gears 1 and 2 are journalled relative to the end plates and to the carrier means.

The differential pinion means 5, 6, 7 and 8 are similar in structure but of what can be termed a reversed relationship as regards each pair of such pinion means.

Therefore as shown in FIG. 3, the upper pinion means 5 and 6 comprise, parallel supporting shafts 27 and 270 the opposite ends of which are mounted in the end plates 21 and 22. These end plates are counter-bored around the shaft accommodating apertures to receive rings 28 and 29 that secure the axially outer races of double-oppositely tapered anti-friction bearing means 30 and 31 against axial displacement. Each of all the differential pinion gear means includes a tubular gear body 32 that has external teeth extending throughout two-thirds its length, the opposite ends of the inner periphery of each gear body 32 are counter-bored to provide internal seatings and shoulders to accommodate the external races of the bearing means 30 and 31. The inner diameter of each tubular body 32 is sufficiently large that a space is provided to accommodate spacing sleeves 33 that fit around the shafts such as 27 and 270 and are dimensioned axially so as to bear at their opposite ends against the axially and radially inner races of the bearing means 30 and 31. As shown in FIG. 3, the pinion means 5 is provided with external teeth 34 on body 32 throughout two-thirds of its length from left to right. The pinion means 6 is provided with external teeth 35 on its body 32 throughout two-thirds of its length from right to left. The teeth on the overlapping intermediate portions of one-third the body length of each body 32 are in intermeshing relationship. The outer one-half length portion of the teeth 34, thus one-third length of body 32, are in mesh with the internal teeth 4 on the input ring gear 1, while similarly the outer one-half portion of the teeth 35 are in mesh with the internal teeth 4 of the output ring gear 2.

The differential pinion means 7 and 8 are of similar structure. However, they are oppositely disposed as regards the relationship of FIG. 3. In other words, the lower pinion gear means 8 has its toothed relationship the same as the upper and, with reference to FIG. 1, diametrically positioned pinion gear means 5 while the respective toothed relationship of pinion gear means 7 and 6 is the same. With this arrangement, there are two diametrically opposed pinion gear means in mesh with the internal teeth of the input ring gear means 1 and two diametrically opposed pinion gear means in mesh with the internal teeth of the output ring gear means 2. The intermediate portions of pinion gear means 5 and 6 and pinion gear means 7 and 8 being in intermeshing relationship.

With this aforedescribed relationship and assuming the center shaft 9 is stationary, the drive relationship is determined by the rotary speed of the input gear 37 on input shaft 38, said gear meshing with the external teeth 4 of input ring gear 1, the size of input gear 37, the size of input ring 1, pinion gear means 5, 6, 7, 8, output ring gear means 2 and the size of output gear 39 that meshes with the external teeth 3 on output ring gear means 2.

To vary this speed relationship and thus provide a differential drive mechanism the central shaft 9 is caused to rotate by an external power source such as indicated diagrammatically at EP in FIG. 2. This power source is independent of the main input power source, not shown and which drives shaft 38. Consequently, by rotating central shaft 9, the carrier means is caused to rotate and the differential pinion means 5, 6, 7, and 8 not only rotate about their own axes but also orbit about the axis of the central shaft 9. With this relationship the r.p.m. output factor can be altered in accordance with the rotational relationship of the central shaft 9. Thus, if the drive relationship between the input gear 37 and output gear 39 is such as to provide 500 r.p.m. at output gear 39 with the central shaft 9 and carrier fixed, by turning this shaft and carrier at 5 or 10 r.p.m. the r.p.m. of such output gear will be accordingly varied.

The particular type of additional external power source can be varied to suit particular purposes.

In other words, a hydraulic type drive can be provided to cause a slow variation in one direction and a fast variation in the other. Alternatively, mechanical gear drives can be applied to the central shaft. Also an electric motor drive through a speed reduction gear having a suitable ratio can be coupled to shaft 9 to effect its rotation in the desired direction and desired speed depending upon the circumstances and the particular operation with which the differential drive mechanism of this invention is associated.

The power source EP and its coupling to shaft 9 must be so proportionately related to the main input power source that it can apply sufficient torque upon central shaft 9 to hold same stationary when it is not desired to vary the speed of output gear 39.

It is also pointed out that all of the rotary components of the differential drive mechanism are journalled on anti-friction bearings so that the alignment factors of the mechanism are improved.

Further it is clear that power or torque transmission between input gear 37 and output gear 39 is directly applied through the teeth on ring gear 1, the teeth on differential pinions 5, 6, 7, 8, the teeth on output ring gear 2 and the output gear 39. There are no keying relationships present and the structural relationship of parts eliminates one gear because of the direct external take-off and drive utilizing a double-tooth relationship.

The form of invention illustrated in FIGS. 4 and 5 provides a simplified structural relationship while retaining the same basic principles as just set forth.

In this embodiment, it is to be noted that, with the component parts in the positions diagrammatically shown in FIG. 4, a vertical central plane CP contains the axes of all the rotating components except the worm gear mentioned hereinafter.

Accordingly, in this form of the invention a base supports spaced uprights or walls that accommodate the input and output shafts, as well as the utilization shafting and gearing relationship. The form of invention of FIGS. 4 and 5 is illustrated with respect to a mill stand of a rolling mill relationship that includes a plurality of aligned roll stands. The material being reduced passes through all the stands and the speed relationship of the reducing rolls in the respective and consecutive stands has to be varied because of the different thickness of material being treated by the successive stands. The overall mill arrangement includes a main mill drive motor means, a line shaft means extending along side and perpendicular to the vertical planes containing the cooperating reducing roll axes for each stand, floating shaft coupling means between each mill stand and a differential drive mechanism of this invention incorporated in the roll drive at each stand for transmitting power to rolls of the respective stands from the line shaft but at controllable variable speeds depending upon speed requirements at the particular mill stands.

Thus, as shown in FIG. 5, the line shaft drive 40 transmits power via bevel gearing 41 to input shaft 42 carrying input pinion 43. Straight roller bearings 44 and 45 journal shaft 42 in housing part 46.

The modified differential drive mechanism includes a cage means or carrier including a body portion 47 having a peripheral flange 48 that has oppositely extending shoulders that accommodate the straight roller bearing means that journal the annular, straight extensions or projections at the axially inner ends of input ring gear 49 and output ring gear 50 respectively. End plates 51 and 52 are recessed to accommodate straight roller bearing means 53 and 54 that journals the annular, straight extensions or projections at the axially outer ends of ring gears 49 and 50. The body portion 47 is bored to accommodate a pair of double pinion means 55 and 56. These pinions are respectively journalled via straight roller bearings 57 and 58 on shafts 59 and 60. These shafts are provided with heads 61 at one end and are threaded at the other end so that by applying bolts 62 to the threaded ends, the end plates 51 and 52 are locked to the body portion 47.

Thus shafts 59 and 60 function as gear shafts, torque rods and tie bars.

The double pinions 55 and 56 are offset within the body as shown so that the teeth 62 at one end of pinion 55 mesh with the internal teeth 63 in input ring gear 49, the teeth 64 at the other end of pinion 55 mesh with the teeth 65 on the inner end of pinion 56 and the teeth 66 on the outer end of pinion 56 mesh with the internal teeth 67 in output ring gear 50.

The carrier or cage is rotatably supported by an end cap construction, including facing, dish-shaped caps 68 and 69 bolted or pinned to end plates 51 and 52 and having centrally disposed, projecting trunnions or pintles 70, that are journalled via straight roller bearing means 71 and 72 in the base or housing structure. The cap 69 has less diameter than cap 68 and the adjacent end plate 52 is recessed so that a worm gear 73 can be secured around cap 67 and to end plate 52 by bolts or pin means. A worm wheel 74 is in mesh with worm gear 73 and is driven by a separate differential drive motor DM via a speed reducer SR to cause the carrier means to rotate when it is desired to alter the speed of the output gear.

The teeth on input pinion 43 are in mesh with the external teeth 75 on input ring gear 49 and the external teeth 76 on output ring gear 50 are in mesh with output pinion 77.

The shaft 78 for output pinion 77 is journalled at one end via straight roller bearings 79 in the housing structure. The other end of this shaft carries a mill drive pinion 80 thereon and includes a projecting spindle 81. Another straight roller bearing means 82 journals the other portion of shaft 78 on the housing structure. Above shaft 78, is another shaft 83 carrying a mill drive pinion 84 that meshes with pinion 80. The shaft 83 is journalled in the housing structure via straight roller bearing means 85 and 86 and also is provided with a projecting spindle 87. It is believed clear that the spindles 81 and 87 are coupled to cooperating reducing rolls not shown.

The aforedescribed arrangement is incorporated at each mill stand so that the speed of output shaft 78 can be varied by the worm gearing drive from the differential motor DM.

Further, as shown in FIG. 4, the axes of the input shaft 42, output shaft 78, trunnions 70, thus ring gears 49 and 50, and worm gear 73 are all in the same vertical plane CP. This provides a compact and balanced structural relationship.

Further, since all anti-friction bearings are straight roller bearings with bronze side plates, this simplifies assembly.

Likewise with my invention as applied to a rolling mill installation, initial cost and maintenance factors can be reduced because the main motor can be an AC motor driving all the mill stands by a line shaft. Each individual stand gear case is connected via floating shaft couplings and the drive to the rolls of each stand is via a bevel gear drive from the line shaft, the differential drive mechanism and the mill drive pinions.

The particular speed required at each stand is obtained by rotating the differential mechanism, via the worm drive, from a variable speed AC motor and speed reducer set to either add or substract r.p.m. relative to that of the line shaft.

This arrangement allows the use of AC motors rather than variable speed DC motors.

It is to be pointed out that both forms of invention described herein are not to be limited to any particular application since my differential drive mechanism can be utilized in power requiring mechanism where the output gear speed has to be independently controlled with reference to an input main shaft speed.

It is likewise to be understood that my invention is not to be limited other than by the scope of the appended claims.

What is claimed is:

1. A differential drive mechanism incluring axially spaced internally and externally toothed ring gear means, a carrier means, at least two intermeshing differential pinion means rotatably carried by said carrier means and in respective direct meshing engagement relation with the internal teeth of the respective ring gear means, external input and take-off gear means in mesh with the external teeth of the respective ring gear means, means for rotating the carrier means to vary the speed of the take-off gear means, said carrier means comprising a body portion and axially spaced end plate means, means securing said body portion and end plate means together, said body portion having recesses therein accommodating said differential pinion means, means supported by said end plate means and supporting said pinion means for rotation, an external flange means on said body portion intermediate said ring gear means and bearing means between said flange means and end plate means and the opposite ends of both ring gear means for rotatably supporting said ring gear means on said carrier means.

2. A differential drive mechanism as claimed in claim 1 in which said differential pinion means comprise two pairs of pinion means, external teeth on each pinion means extending over a distance substantially two-thirds its length, two of said pinion means having such teeth extending from left to right and the other two pinion means having such teeth extending from right to left when all such pinions are viewed transverse to their axes, an intermediate portion of the teeth of each pair being in intermeshing relation, the remaining portion of the teeth of one pinion means of each pair meshing with the internal teeth of one of said ring gear means, the remaining portion of the teeth of the other pinion of each pair meshing with the internal teeth of the other of said ring gear means, said body portion having an axial extent just slightly in excess of the axial extent of said pinion means, said end plate means having aligned shaft accommodating apertures therethrough, supporting shaft means for each pinion means supported in said apertures, said end plate means and body portion having aligned, centrally disposed, axially extending bores therein, a shaft within said bores, and means securing said body portion to said last-mentioned shaft, whereby rotation of said shaft rotates said body portion and thus orbits said differential pinion means.

3. A differential drive mechanism including axially spaced internally and externally toothed ring gear means, a carrier means, at least two intermeshing differential pinion means rotatably carried by said carrier means and in respective direct meshing engagement relation with the internal teeth of the respective ring gear means, external input and take-off gear means in mesh with the external teeth of the respective ring gear means, means for rotating the carrier means to vary the speed of the take-off gear means, said carrier means including a body portion and axially spaced end plate means securing said body portion and end plate means together, said body portion having an external peripheral flange means intermediate its length, said body portion having recesses therein accommodating said differential pinion means, said differential pinion means comprising two parallel double-portioned pinion means, a shaft means for each of said double-portioned pinion means, said end plate means having aligned apertures therethrough accommodating said shaft means, said ring gear means being disposed about said body portion at opposite sides of said flange means, each of said double-portioned pinion means being mounted on one of said shaft means with the axially inner portions of said pinion means in intermeshing relation and the axially outer portions respectively meshing with the internal teeth of the respective ring gear means, means on opposite ends of said shaft means externally of said end plate means for securing said end plate means and body portion together, said carrier means also including facing, dish-shaped end caps connected to the respective end plate means, aligned trunnions projecting outwardly of said end caps for rotatably supporting said carrier means, annular gear means around and fixed relative to one of said interconnected end plate means and end caps, and means for rotating said last-mentioned gear means and thus said carrier means to vary the speed relationship of said take-off gear means.

4. A differential drive mechanism as claimed in claim 3 and straight roller bearing means between said double-portioned pinion means and their shaft means, between said flange means and end plate means and the respective opposite ends of said ring gear means and around said trunnions.

5. A differential drive mechanism as claimed in claim 3 in which the axes of said shaft means are equi-spaced from the axis of said trunnions, and the axes of said trunnions, said ring gear means, said annular gear, said input gear means and said take-off gear means all lying in a common plane.

6. A differential drive mechanism as claimed in claim 1 and each said ring gear means having oppositely directed, annular extensions projecting beyond the opposite ends of their teeth, said bearing means rotatably supporting the respective axially outermost extensions relative to said end plate means and the respective axially innermost extensions relative to said flange means.

7. A differential drive mechanism as claimed in claim 6 in which all said extensions are straight.

8. A differential drive mechanism as claimed in claim 6 in which the extension projecting beyond one end of each ring gear means includes a portion radially spaced from the extension projecting beyond the other end of each ring gear means.

9. A differential drive mechanism as claimed in claim 8 in which said portions are spaced radially outwards of the extensions projecting beyond the other end of each ring gear means.

References Cited

UNITED STATES PATENTS

| | | | |
|---|---|---|---|
| 694,724 | 3/1902 | Brown | 74—714 |
| 1,406,627 | 2/1922 | Elbertz | 74—714 |
| 2,309,559 | 1/1943 | Wemp | 74—675 X |
| 2,577,604 | 12/1951 | Chillson | 74—675 X |
| 2,730,182 | 1/1956 | Sloane | 74—675 X |
| 3,365,981 | 1/1968 | Gantzer | 74—687 |

DONLEY J. STOCKING, Primary Examiner

T. C. PERRY, Assistant Examiner

U.S. Cl. X.R.

74—714